(12) United States Patent
Nifenecker et al.

(10) Patent No.: US 11,925,888 B2
(45) Date of Patent: Mar. 12, 2024

(54) COMPONENT FOR A TURBOMACHINE CENTRIFUGAL DEGASSER WITH ADAPTED LONGITUDINAL WALLS

(71) Applicant: SAFRAN HELICOPTER ENGINES, Bordes (FR)

(72) Inventors: Arnaud Georges Nifenecker, Moissy-Cramayel (FR); Benjamin Nicolas Fulleringer, Moissy-Cramayel (FR); Nicolas Maurice Marcel Herran, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 64 days.

(21) Appl. No.: 17/612,804

(22) PCT Filed: May 20, 2020

(86) PCT No.: PCT/FR2020/050836
§ 371 (c)(1),
(2) Date: Nov. 19, 2021

(87) PCT Pub. No.: WO2020/240116
PCT Pub. Date: Dec. 3, 2020

(65) Prior Publication Data
US 2022/0249995 A1    Aug. 11, 2022

(30) Foreign Application Priority Data
May 24, 2019   (FR) ........................................ 1905487

(51) Int. Cl.
*B01D 45/14* (2006.01)
*B04B 7/18* (2006.01)
(Continued)

(52) U.S. Cl.
CPC ................ *B01D 45/14* (2013.01); *B04B 7/18* (2013.01); *B04B 11/00* (2013.01); *F01D 25/18* (2013.01)

(58) Field of Classification Search
CPC .......... B01D 45/14; B01D 45/16; B04B 7/18; B04B 11/00; F01D 25/18; F05D 2230/31;
(Continued)

(56) References Cited

U.S. PATENT DOCUMENTS 3,561,195 A * 2/1971 Bouru ..................... F01D 25/18
494/900
3,630,379 A * 12/1971 Sharples ................... B04B 7/18
210/497.1

(Continued)

FOREIGN PATENT DOCUMENTS

EP  3 112 031 A1  1/2017
FR  3 071 418 A1  3/2019

(Continued)

OTHER PUBLICATIONS

English translation of Written Opinion dated Oct. 2, 2020, issued in corresponding International Application No. PCT/FR2020/050836, filed May 20, 2020, 4 pages.

(Continued)

*Primary Examiner* — Dung H Bui
(74) *Attorney, Agent, or Firm* — CHRISTENSEN O'CONNOR JOHNSON KINDNESS PLLC (57) ABSTRACT

A component for a centrifugal degasser for an air/oil mixture of a turbomachine is disclosed. The degasser rotates about an axis of symmetry, forming an annular chamber for centrifugal separation of the mixture. The chamber forms a fluid passage duct, one inlet of which is oriented axially for supplying the chamber with the mixture, and a first outlet of which is oriented radially inwards for discharging the (Continued)

deoiled air separated from the mixture. The chamber also includes at least one second oil outlet oriented radially outwards and intended to discharge the oil separated from the mixture to the outside of the degasser. The chamber has longitudinal walls passing radially therethrough, at least one of the surfaces of the longitudinal walls having surface structures and/or corrugations arranged to form obstacles to a flow of the mixture along the surface of the longitudinal walls.

11 Claims, 8 Drawing Sheets

(51) Int. Cl.
  *B04B 11/00* (2006.01)
  *F01D 25/18* (2006.01)
(58) Field of Classification Search
  CPC ......... F05D 2250/183; F05D 2250/184; F05D 2260/609
  See application file for complete search history.

(56) References Cited

U.S. PATENT DOCUMENTS

| | | | | |
|---|---|---|---|---|
| 4,049,401 | A * | 9/1977 | Smith | F04C 29/026 55/525 |
| 5,114,446 | A * | 5/1992 | Giersdorf | F01D 25/18 55/438 |
| 5,716,423 | A * | 2/1998 | Krul | B01D 45/14 55/487 |
| 5,776,229 | A * | 7/1998 | Blanes | F01D 25/18 96/216 |
| 6,033,450 | A * | 3/2000 | Krul | B01D 45/14 55/438 |
| 6,398,833 | B1 * | 6/2002 | Santerre | B01D 45/12 55/525 |
| 6,858,056 | B2 * | 2/2005 | Kwan | B01D 46/12 55/400 |
| 6,893,478 | B2 * | 5/2005 | Care | F01M 13/04 55/401 |
| 8,657,931 | B2 * | 2/2014 | Short | F01M 13/04 55/408 |
| 9,028,576 | B2 * | 5/2015 | Slayter | F02C 7/32 55/408 |
| 10,018,087 | B2 * | 7/2018 | Prunera-Usach | B01D 50/20 |
| 10,870,079 | B2 * | 12/2020 | Brouillet | B01D 46/0031 |
| 10,918,989 | B2 * | 2/2021 | Brouillet | F02C 7/06 |
| 2003/0089656 | A1 * | 5/2003 | Kwan | B01D 46/026 210/337 |
| 2005/0211093 | A1 * | 9/2005 | Latulipe | F01D 25/18 55/400 |
| 2007/0289632 | A1 * | 12/2007 | Della Casa | B01D 21/262 137/173 |
| 2011/0258977 | A1 * | 10/2011 | Dejaune | F01D 25/18 55/409 |
| 2012/0102900 | A1 * | 5/2012 | Belmonte | F01D 25/18 55/436 |
| 2013/0042760 | A1 * | 2/2013 | Short | F01M 13/04 74/606 R |
| 2013/0112029 | A1 * | 5/2013 | Slayter | F02C 6/00 74/467 |
| 2013/0195608 | A1 | 8/2013 | Gharaibah | |
| 2013/0319240 | A1 * | 12/2013 | Short | F01D 25/183 95/268 |
| 2014/0182253 | A1 * | 7/2014 | Zecchi | B01D 46/26 55/495 |
| 2015/0176447 | A1 * | 6/2015 | Beier | F02C 7/32 415/110 |
| 2016/0208650 | A1 * | 7/2016 | Craig | B01D 46/62 |
| 2018/0117512 | A1 * | 5/2018 | Janakiraman | B01D 46/003 |
| 2018/0169556 | A1 * | 6/2018 | Parikh | B01D 45/14 |
| 2019/0360578 | A1 * | 11/2019 | Chevillot | F16H 57/0456 |
| 2020/0011246 | A1 * | 1/2020 | Pajard | B04B 5/08 |
| 2020/0072126 | A1 * | 3/2020 | Fulleringer | F02C 7/06 |
| 2020/0222841 | A1 * | 7/2020 | Nifenecker | B01D 45/12 |
| 2020/0316506 | A1 * | 10/2020 | Pereira | B01D 45/14 |
| 2021/0131322 | A1 * | 5/2021 | Nifenecker | B01D 45/14 |

FOREIGN PATENT DOCUMENTS

| | | | | |
|---|---|---|---|---|
| FR | 3083570 | A1 * | 1/2020 | ............ B01D 45/14 |
| WO | WO-2020008153 | A1 * | 1/2020 | ............ B01D 45/14 |
| WO | WO-2020008156 | A1 * | 1/2020 | ......... B01D 39/2051 |

OTHER PUBLICATIONS

International Preliminary Report on Patentability dated Nov. 16, 2021, issued in corresponding International Application No. PCT/FR2020/050836, filed May 20, 2020, 6 pages.
International Search Report dated Oct. 2, 2020, issued in corresponding International Application No. PCT/FR2020/050836, filed May 20, 2020, 5 pages.
Written Opinion dated Oct. 2, 2020, issued in corresponding International Application No. PCT/FR2020/050836, filed May 20, 2020, 5 pages.

* cited by examiner

COMPONENT FOR A TURBOMACHINE CENTRIFUGAL DEGASSER WITH ADAPTED LONGITUDINAL WALLS

FIELD OF THE DISCLOSURE

The disclosure relates in particular to a centrifugal degasser for a turbomachine.

BACKGROUND

The technical background comprises, in particular, the documents FR-A1-3 071 418, EP-A1-3 112 031 and US-A1-2013/195608.

The turbomachines are a complex system involving a number of rotating assemblies (turbines, compressor, etc.) which must be equipped with sealing devices. These sealing devices are generally made by labyrinths of pressurised air arranged in the vicinity of the rotating assemblies. For this purpose, air is taken directly from the air duct of the turbomachine. This air then passes through the turbomachine via the various labyrinths provided for this purpose, and is then evacuated towards the outside of the turbomachine to limit the pressure build-up in other areas of the turbomachine, in particular the reduction gear, the accessory gearbox, etc. This air, having passed through various areas of the turbomachine, is charged with oil used for cooling and lubricating the bearings and pinions of the rotating assemblies. In order to avoid the release of oil-laden air, to reduce the environmental impact of turbomachines, to reduce the oil consumption and to reduce the need to refill the oil reservoirs, it is important to provide degassers that separate the oil from the air before discharging the air to the outside of the turbomachine.

Such a degasser is generally arranged and driven by a mechanical power take-off at the accessory gearbox or reduction gear of the turbomachine.

In a known manner, such a centrifugal degasser comprises one or more enclosures for centrifugal separation of the air/oil mixture arranged around a hollow shaft and delimited by an outer annular wall and an inner annular wall. The degasser further comprises an axial inlet for supplying the enclosure with the air/oil mixture, and a peripheral oil outlet provided in the outer wall. Thus, when the degasser is rotated, generally by means of a pinion of the accessory gearbox or reduction gear, the oil is naturally drawn by centrifugal force towards the oil outlet provided at the periphery of the degasser. In addition, an oil-free air outlet is provided in the inner wall and connected to the hollow shaft, which allows the air to be exhausted to the outside.

Some degassers, such as the one described in the application WO-A1-2011/004023, also comprise filters arranged in the enclosure of the degasser to improve the capture of oil drops and thus promote the de-oiling of the mixture. In effect, the filters increase the available contact surface and thus improve the likelihood of an oil drop carried by the mixture flux being caught on a wall. These filters are usually made of a metal foam, such as a foam marketed under the name Retimet®.

However, the performance of known degassers is generally handicapped by internal pressure losses which are due to two causes in particular, the shapes of the duct, comprising the centrifugal enclosure, through which the air flux is passing during de-oiling, and the presence of the metal foam.

With regard to the internal shapes of the degasser delimiting the duct used by the air flux, the manufacturing process can then be limiting with regard to the potential for optimal geometry to be achieved.

With regard to the presence of metal foam, the pressure losses are due to the fact that at high speeds (for example, for speeds of the order of 6,000 rpm), the front surface constituted by the metal foam acts like a wall and the degree of penetration of the air particles into the foam is low. From this point of view, the known manufacturing processes, integrating for example a specific foam, do not allow the control of the geometry of the structure.

It is therefore complex to find a technological solution/means of production compatible with the two aspects of minimising losses and optimising de-oiling capacity. There is therefore a need to improve the design of the centrifugal separation enclosure to optimise the de-oiling performance while limiting the pressure drop across the degasser.

SUMMARY

The disclosure relates to a component for a centrifugal degasser for a an air/oil mixture of a turbomachine, intended to rotate about an axis of symmetry, forming an annular enclosure for centrifugal separation of the mixture, the enclosure forming a fluid passage duct, one inlet of which is oriented axially for supplying the enclosure with the mixture, and a first outlet of which is oriented radially inwards for discharging the de-oiled air separated from the mixture, the enclosure further comprising at least one second oil outlet oriented radially outwards and intended to discharge the oil separated from the mixture to the outside of the degasser, characterized in that the enclosure comprises longitudinal walls passing radially therethrough, at least one of the surfaces of the longitudinal walls having surface structures and/or corrugations arranged to form obstacles to a flux of the mixture along the surface of the longitudinal walls.

The longitudinal walls extend radially and form stator fins which cause the mixture to rotate as it passes through the centrifugal enclosure. In addition, the oil forms a mist of droplets suspended in the mixture. The droplets, which are heavier than air, are carried to the periphery by centrifugal force, but a large proportion of them are also caught by the rotating longitudinal walls. They then form an oil film which flows towards the periphery of the enclosure and then towards the discharge outlets, still under the effect of the centrifugal force. The structures or corrugations on the surface of the longitudinal walls have two functions. On the one hand, they improve the capture of oil droplets by forming obstacles on which the mixture comes up against or by capturing droplets that tend to bounce off the wall. On the other hand, they can also form protections for the oil film by passing the air flux along the wall above the oil film and thus preventing it from carrying away oil already deposited on the wall.

Preferably, the component comprises an annular row of the longitudinal walls forming, between two successive longitudinal walls, passages for the flux through the enclosure in the axial direction, the distance between the longitudinal walls being less than their radial extension.

By multiplying the number of longitudinal walls, the probability of a drop being captured by one of them is maximised.

Advantageously, the surface of the longitudinal walls may have a roughened surface, so as to protect an oil film from the flux of the mixture.

The roughness asperities can on the one hand prevent droplets from bouncing back and on the other hand protect the oil film present in the crevices formed between the asperities. The height and basis weight of the asperities must be adapted locally to the thickness of the oil film that forms on the wall.

In a preferred embodiment, the longitudinal walls form thin plates having corrugations in the axial direction.

The corrugations of the longitudinal walls give a sinuous shape to the compartments between two walls, the droplets of the mixture whose flux follows the compartment in the axial direction are thus more easily captured on the surface of the longitudinal walls.

Even more preferably, channels excavated on at least one of the faces of the longitudinal walls extend radially thereon, so as to drain an oil film towards an outer peripheral wall of the centrifugal enclosure.

In addition, the oil film formed within the channels is protected from the air flux along the wall. For this purpose, the depth and width of the channels can be adjusted according to the location in the centrifugal enclosure, to take account of the amount of oil drained locally by the oil film.

Advantageously, several channels are arranged between two folds of a corrugation.

Preferably, the second oil outlet comprises orifices passing through an outer peripheral wall of the centrifugal enclosure, positioned in each compartment between two longitudinal walls at the level of the folds between two corrugations.

Some of the longitudinal walls can start after the others in the axial direction, behind the axial inlet.

This ensures that the radial channels are not immediately saturated with large droplets. This also allows, when the walls form a tight network, not to clog the inlet of the centrifugal enclosure and to progressively direct the flux of mixture into the compartments between the walls, thus limiting the pressure losses.

Advantageously, such a component is manufactured in one component, for example by additive manufacturing.

The additive manufacturing allows to optimise both the shapes of the structural part, to direct the flux of the fluid passing through it in order to minimise the pressure losses, and to easily integrate an annular row of longitudinal walls which are housed in the appropriate space of the duct, to improve the performance of separation of the oil and air.

The disclosure also relates to a component as described above, which comprises one or more of the following features:
- the enclosure further comprises an outer peripheral wall of generally cylindrical shape pierced with a plurality of orifices,
- the radially inner surface of the peripheral wall comprises recessed patterns connected to the mouth of the orifices, so as to drain the oil collected by the peripheral wall to the orifices.

The recessed patterns guide oil droplets collected by the peripheral wall to the discharge orifices and thus prevent the creation of oil pockets along this wall. In addition, they create areas where the oil pressed against the wall and being discharged is relatively protected from the main air flux in the enclosure and thus limit the risk of this oil being re-entrained towards the de-oiled mixture outlet.

Preferably, the enclosure is divided into an annular row of compartments separated by longitudinal walls, the peripheral wall comprising at least one orifice in each compartment.

The longitudinal walls, parallel to the axis of symmetry, extend radially. They form stator fins which drive the air and oil mixture in rotation in the enclosure. The separation of the enclosure into a plurality of compartments optimises the efficiency of the degasser for a separation by centrifugation.

Preferably, each compartment comprises a plurality of orifices, positioned at points where the radial distance from the radially inner surface of the peripheral wall has a maximum.

The radial distance being the distance to the axis of symmetry about which the assembly rotates, it is naturally towards these points that the oil droplets captured by the rotating peripheral wall are directed.

The radially inner surface of the peripheral wall may have corrugations in the circumferential and/or axial direction within each compartment.

The pitch of the corrugations and/or their radial amplitude may change as a function of the axial location.

The pitch of the corrugations and/or their radial amplitude may change as a function of the circumferential location within each compartment.

According to a particular embodiment, the radially inner surface of the peripheral wall comprises longitudinal channels.

According to another embodiment, possibly combinable with the previous one, the radially inner surface of the peripheral wall comprises troughs each surrounding the mouth of an orifice.

Advantageously, a component as described above is manufactured in one component, for example by additive manufacturing. In particular, the additive manufacturing corresponds to complex shapes of the peripheral wall to optimise the efficiency of the patterns.

The disclosure also relates to a centrifugal degasser for an air/oil mixture of a turbomachine comprising a component as described above, a hollow shaft secured to the component and configured to collect the air leaving the internal radial outlet, and a pinion for rotating the assembly.

DESCRIPTION OF THE DRAWINGS

Other features and advantages of the disclosure will become apparent from the detailed description that follows, for the understanding of which reference is made to the annexed drawings in which.

DETAILED DESCRIPTION

In the figures, the scales and proportions are not strictly respected for the sake of illustration and clarity.

Figure 1:
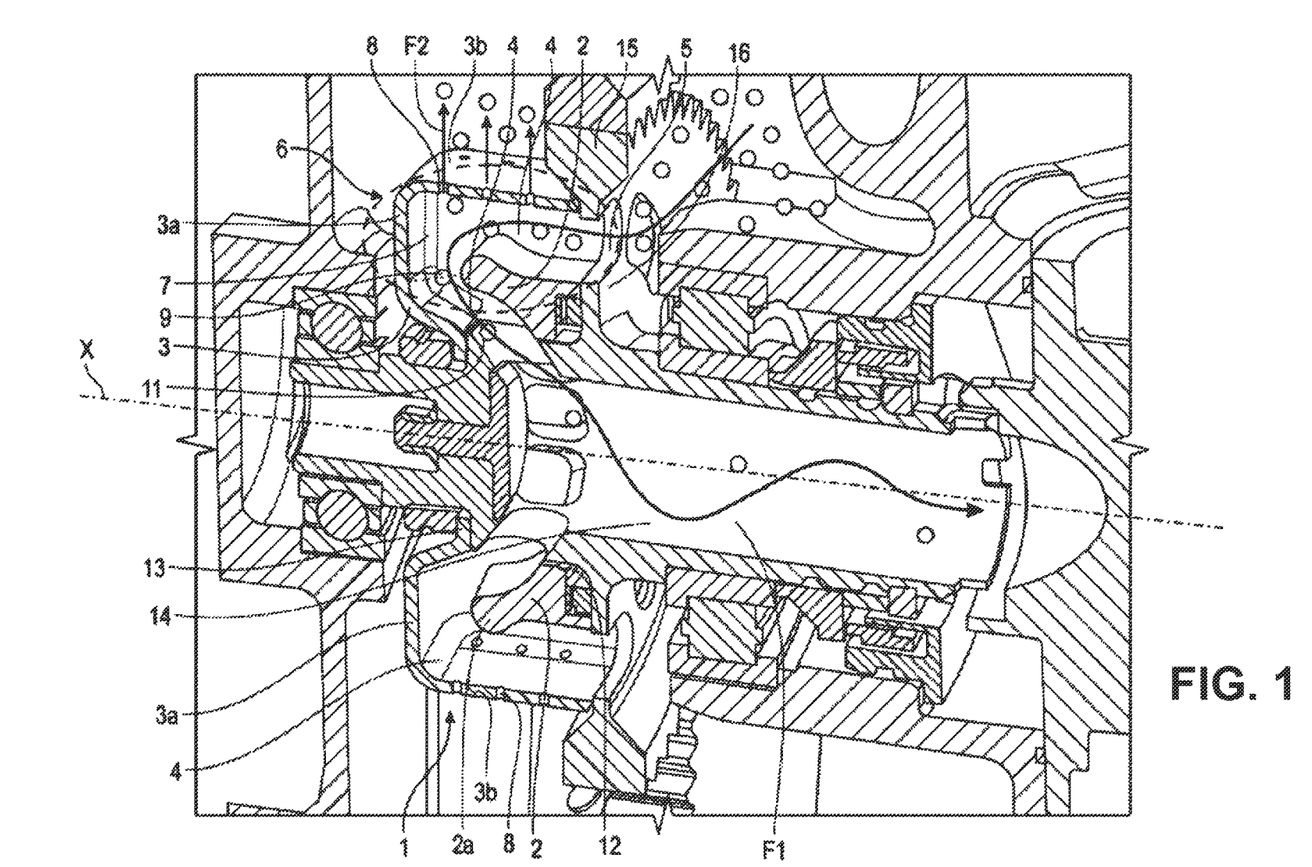
FIG. 1 is a schematic perspective view of a degasser concerned by the disclosure, cut along a plane of symmetry.
Figure 2:
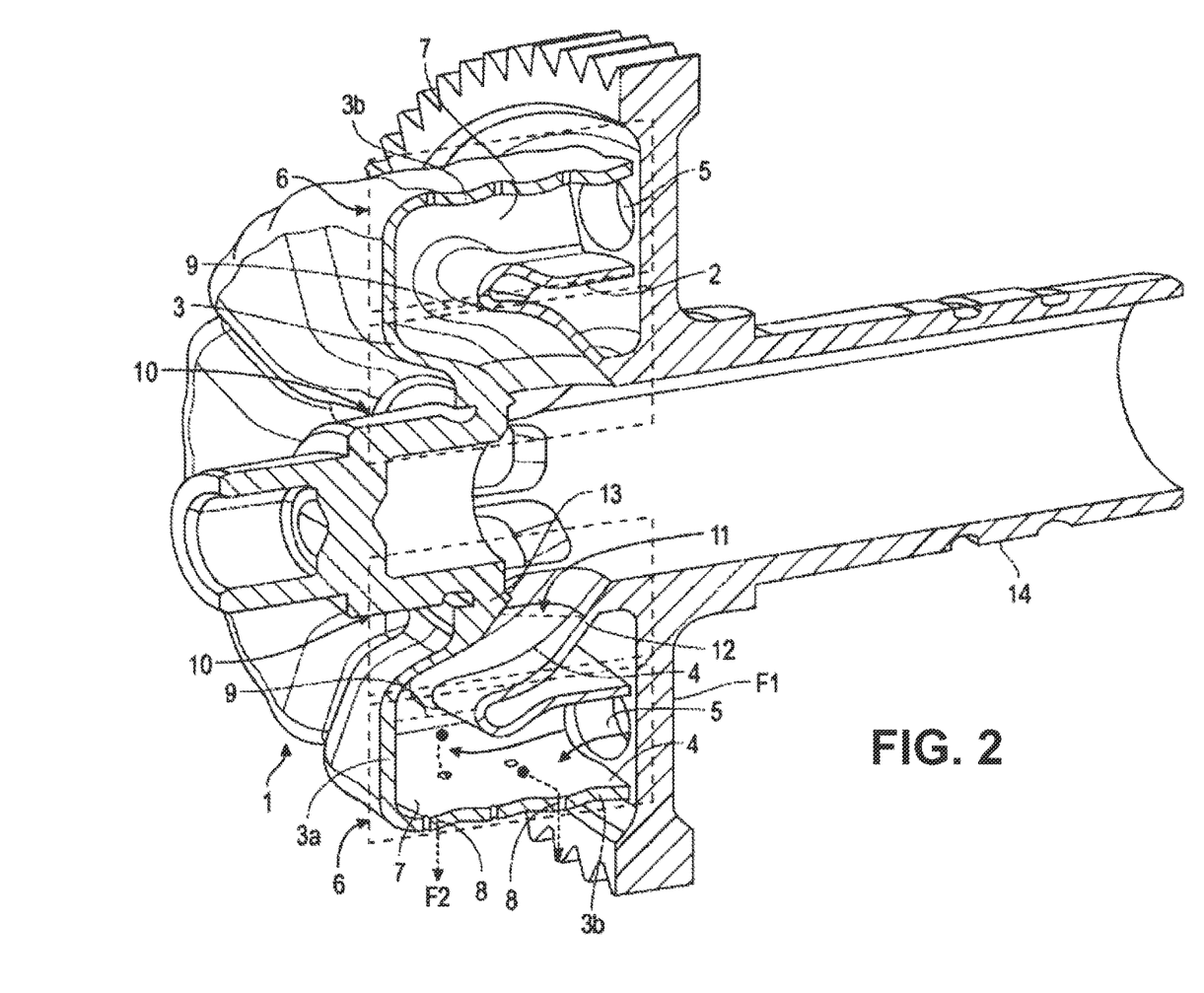
FIG. 2 is a schematic perspective view of the moving component of the degasser of FIG. 1, taken out of the fixed casing and cut along a plane of symmetry.

A degasser using the disclosure comprises, as shown in FIGS. 1 and 2, a moving component 1 rotating around a longitudinal axis of symmetry X. The moving component 1 comprises a structural part which comprises a first shell 2 surrounded by a second shell 3. The space between the two shells 2, 3, forms a duct 4 of revolution around the central axis of symmetry X, intended to circulate the mixture of air and oil to be separated.

The duct 4 comprises an axial inlet 5 intended for the inlet of the air and oil mixture to be separated. This axial inlet 5 corresponds to a first end of a first portion 6 of the duct 4 which extends essentially axially, in order to centrifuge the mixture. The first portion of the duct 6, axially extending, acts as a centrifugal enclosure, as this is where the centrifugal force is exerted most strongly on the air/oil mixture. It is therefore referred to as the centrifugal enclosure 6 in the following description.

The duct 4 further comprises, here, a plurality of compartments distributed circumferentially around the axis of symmetry X. The compartments are formed between radially extending longitudinal bulkheads 7. Advantageously, these axial bulkheads 7 connect the first 2 and the second shell 3, thus forming a connection which secures them. Each compartment communicates with the axial inlet 5 of the mixture.

At its second axial end, the centrifugal enclosure 6 is axially closed by a portion 3a of the second shell 3, substantially perpendicular to the axis of symmetry X, and comprises a radial opening 9 towards the axis of symmetry X between the first 2 and the second shell 3. The second shell 3 forms a radially outer wall 3b of the centrifugal enclosure 6 which is substantially annular, between the inlet 5 and the portion 3a of the second shell which axially limits the centrifugal enclosure 6 at its second end. The centrifugal enclosure 6 comprises a plurality of radial oil outlets 8 in the form of through orifices in the radially outer wall 3b and is configured to be able to discharge the oil separated from the mixture by the centrifugal force of the degasser. Each compartment of the duct 4 is connected to one or more radial oil outlets 8.

The first shell 2 forms a radially inner wall of the compartments of the duct in the centrifugal enclosure 6. It stops axially before the axial portion 3a of the second shell 3, starting from the inlet 5 of the duct, to provide the radial opening 9 inwards at the second end of the centrifugal enclosure 6. Its shape can be optimised to promote oil separation and to minimise pressure losses, in particular, at the level of the bend formed at the radial outlet. In the example shown, the radially inner wall is substantially annular starting from the axial inlet 5 and comprises an axial end 2a opposite the axial inlet 5 forming a rounded circumferential bead or plateau at the second end of the centrifugal enclosure 6. This shape of the axial end 2a of the first shell tends to send the fluid radially outwards through the bend formed in the duct 4 at the outlet of the centrifugal enclosure 6, so as to optimise the flow of the air/oil mixture flux.

The duct 4 comprises a second portion 10 which communicates with the centrifugal enclosure 6 through the radial opening 9 between the first 2 and second 3 shells and which is configured to guide the fluid to a radial outlet 11 in an empty cylindrical space, which extends axially between the limits of the centrifugal enclosure 7. The first 2 and second 3 shells form clamps 12, 13, which limit the empty cylinder space. These clamps 12, 13 are configured to connect the component 1 to a hollow shaft 14, which drives the component in rotation.

The component 1 is used in a degasser which comprises a pinion 15 for rotating the component, itself comprising a web 16. In the example shown, the web 16 is securely connected to the moving component 1 and comprises openings opposite the axial inlet 5 for the passage of the mixture into the compartments of the duct 4. The web 16 is also securely connected to the hollow shaft 14.

Advantageously, the component 1 is produced by an additive manufacturing method which allows to produce the complex shapes of the example, in particular with a view to promoting the separation of the oil droplets from the mixture while minimising the pressure losses. The additive manufacturing of the assembly can be done, in a known way, by a process of controlled laser melting of a metallic powder. However, the example presented is by no means limiting for the implementation of the disclosure and manufacturing methods by machining or casting can also be used for more conventional shapes of the passage duct of the mixture in the moving component 1.

As indicated by the arrow F1 in FIG. 1, the oil-containing air thus enters the moving component 1 through the openings in the web 16 towards the axial inlet 5 of the compartments of the centrifugal enclosure 6. The longitudinal bulkheads 7 form stator fins which drive in rotation the mixture entering the adjacent compartments. By centrifugal effect, the oil is discharged to the outside of the moving component 1 through orifices 9 as shown by the arrows F2. The de-oiled air that has passed through the centrifugal enclosure 6 then enters the hollow shaft 14 through the radial outlet 11 and is discharged.

The oil present in the mixture forms a mist consisting of more or less fine droplets, represented schematically by dots in FIGS. 1 and 2. The droplets are captured by the axial bulkheads 7 of the component 1 in rotation or stuck to the peripheral wall 3b of the centrifugal enclosure 6, where they form an oil film, which is drained by centrifugal force along the walls and then ejected to the outside of the degasser through the orifices 8 provided on the peripheral wall 3b.

Figure 3:
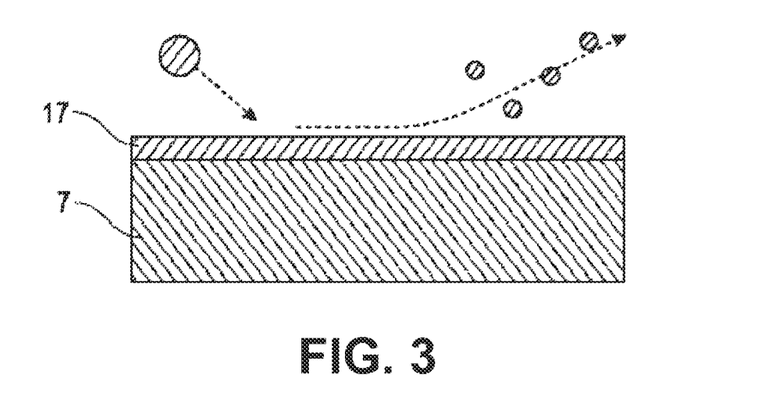
FIG. 3 shows schematically the interaction between the flow in the degasser and the oil film deposited on a smooth wall according to the prior art.

However, as shown in FIG. 3, under the effect of the air passing through the degasser, droplets, possibly fine ones, are torn from the oil film 17 formed on the surface of a wall, for example an axial bulkhead 7. This effect is particularly troublesome along the longitudinal bulkheads 7. As the centrifugal force does not drive them directly towards the bulkhead 7 from which they have just escaped, some of these droplets, carried along by the air flux along the bulkhead 7, will not be recaptured and leave in the hollow shaft 14 through the radial outlet 11, thus impairing the performance of the degasser.

According to one aspect of the disclosure, the shape of the axial bulkheads 7 is modified to limit this phenomenon.

Figure 4:
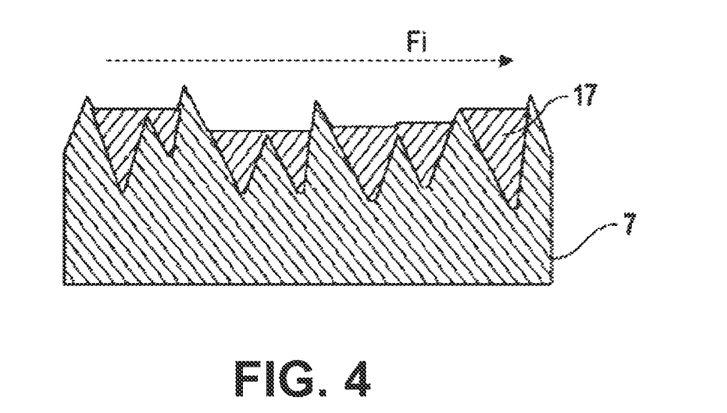
FIG. 4 shows schematically the state of the oil film deposited along a longitudinal wall according to a first embodiment of the disclosure.

In a particular embodiment, illustrated in FIG. 4, the surface of the axial bulkheads is treated so as to be rough. The structure-related asperities are irregular but have an average height slightly greater than the thickness of the oil film 17 forming against the bulkhead 7, typically of the order of a tenth of a millimetre. On the one hand, the asperities form obstacles against which the droplets abut and limit the rebound phenomenon. On the other hand, as shown in FIG. 4, the asperities create crevices that protect the oil film 17 by hiding it from the air flux Fi going alongside the wall. The oil film 17 can then work its way through the crevices to rise radially towards the peripheral wall 3b comprising the outlet orifices 8.

Figure 5:
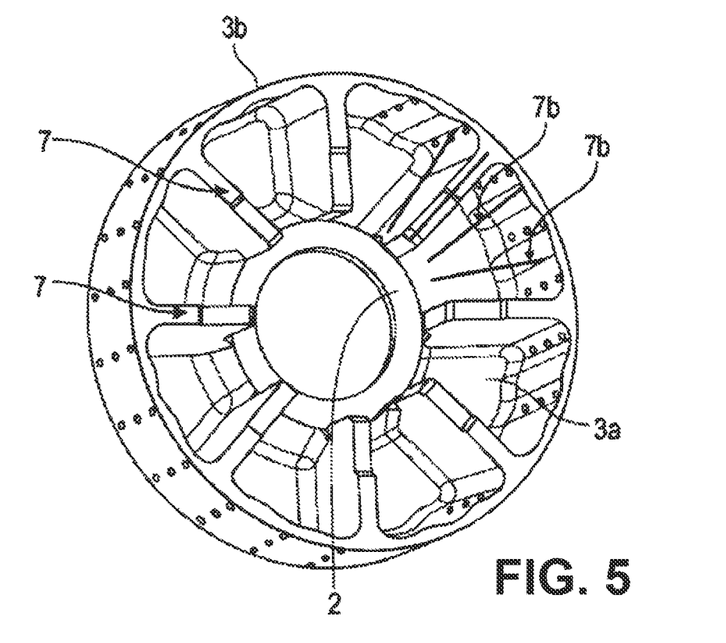
FIG. 5 shows schematically the principle of implementation of a second embodiment of the disclosure on a perspective view of the enclosure of the degasser of FIG. 1, cut along a transverse plane.

According to another aspect of the disclosure, as illustrated in FIG. 5, the number of longitudinal bulkheads 7b is multiplied, so that the distance between two successive bulkheads 7b is significantly smaller, at least by a factor of three, than the radial extension of the centrifugal enclosure 6. Referring to the example in FIG. 8, this distance is at least ten times smaller than the radial extension of the bulkheads 7b. Bringing the bulkheads 7b closer together thus increases the probability that the droplets bouncing off one bulkhead will be caught by the adjacent bulkhead.

Figure 6:
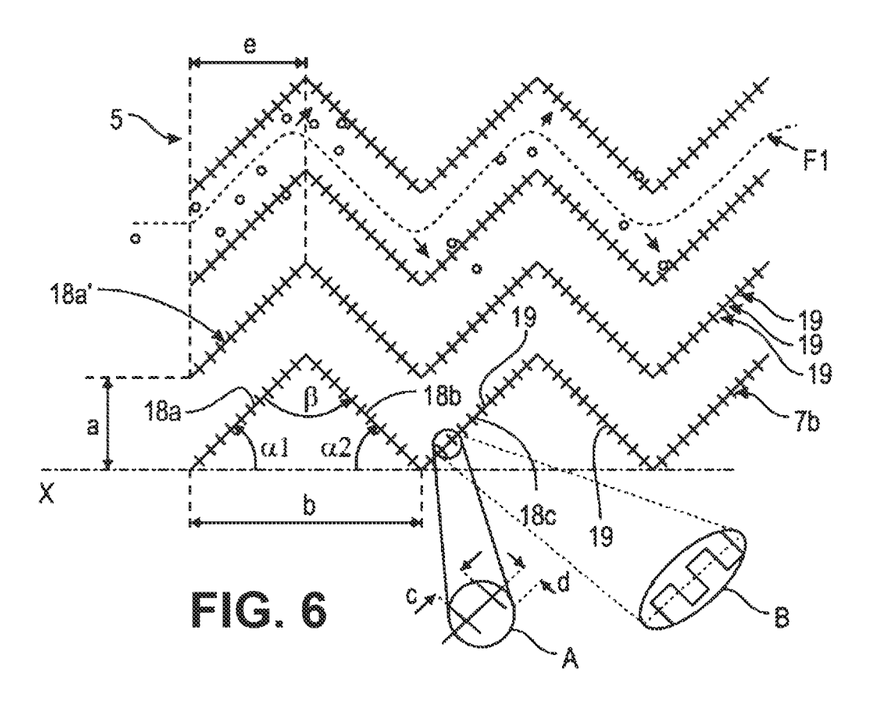
FIG. 6 shows very schematically, in circumferential section, the cross-section of the longitudinal walls for a variant of the second embodiment.
Figure 7:
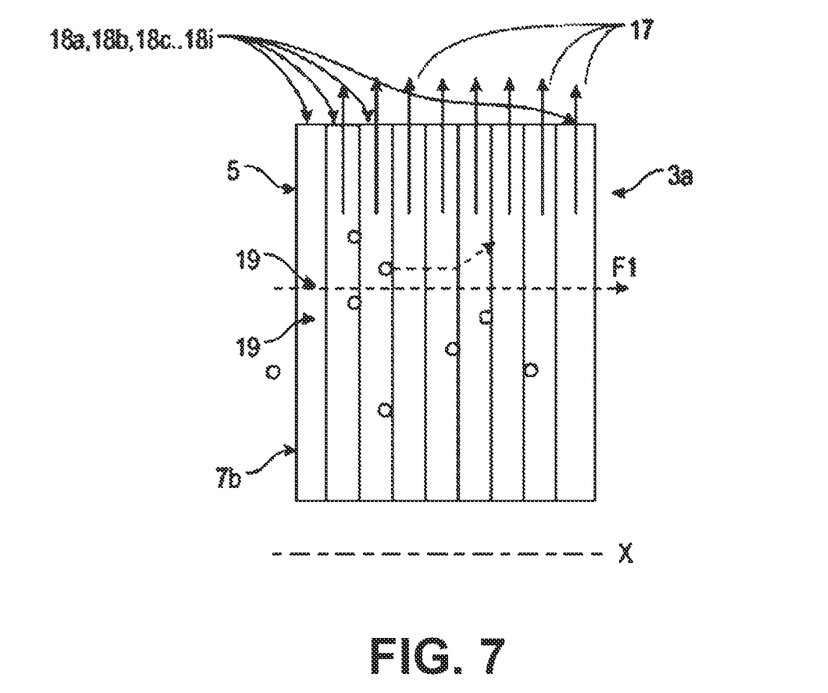
FIG. 7 shows very schematically a side view of one of the longitudinal walls of FIG. 5.
Figure 8:
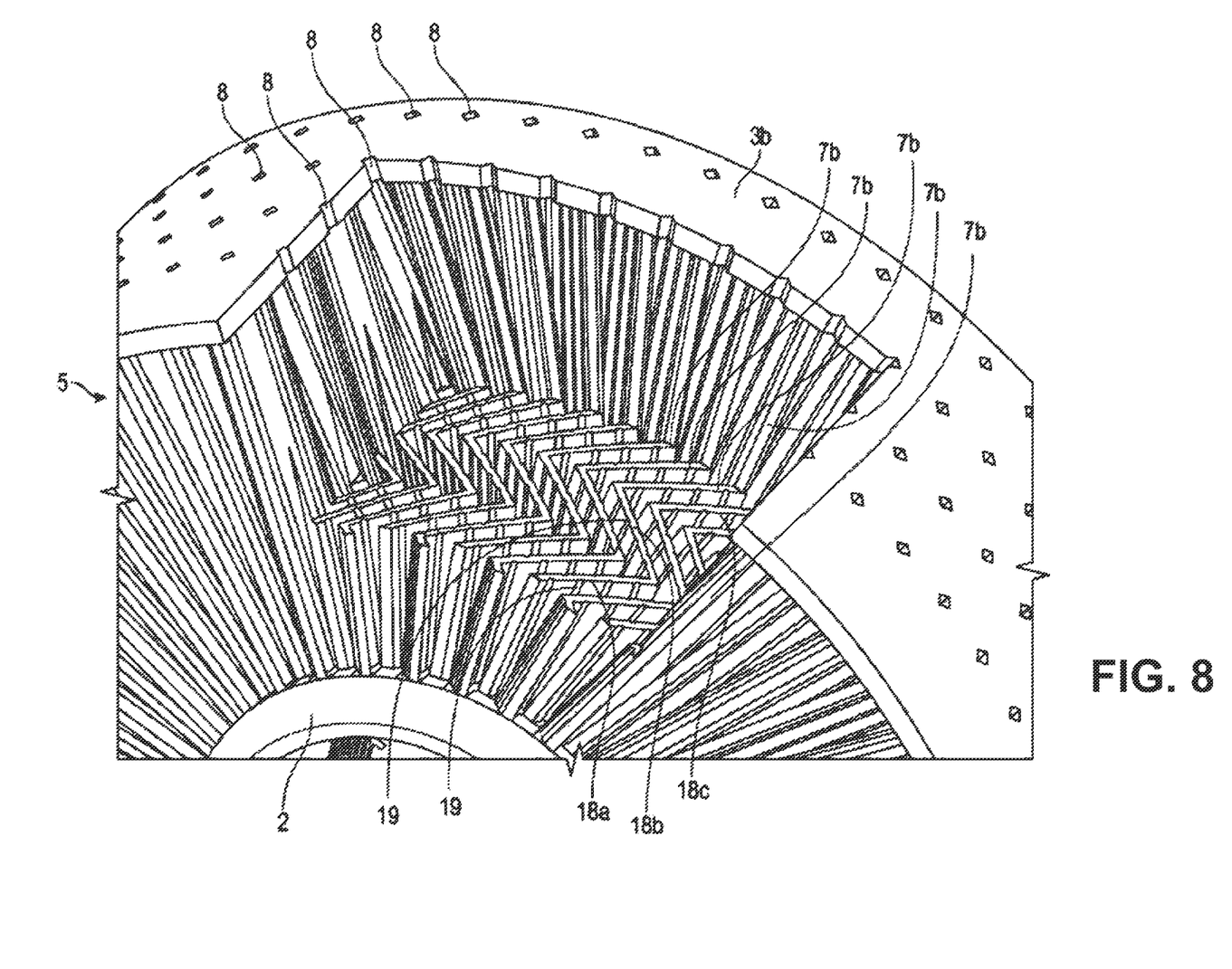
FIG. 8 shows a perspective view, seen from the front, of a cutaway of the component corresponding to the variant whose principle was presented in FIGS. 5 and 6.

Furthermore, in an embodiment illustrated in FIGS. 6 to 8, the surface of the bulkheads 7b is also modified to improve the capture of the droplets and promote a flow of the oil film 17 towards the peripheral wall 3b where the outlet orifices 8 are located.

With reference to FIGS. 6 and 7, the profile of the bulkheads 7b in the axial direction forms corrugations in the form of periodic zig-zags. Each bulkhead 7b comprises a succession of radial flat plates 18a, 18b, 18c . . . , inclined successively with respect to the longitudinal axis X by a defined angle $\alpha_1$ in one direction, then by an angle $\alpha_2$ in the opposite direction. They thus form a succession of herring-bones of defined axial extension b and opening angle $\beta=180°-(\alpha_1+\alpha_2)$. As the angles $\alpha_1$ and $\alpha_2$ are not necessarily equal, the herringbones are not necessarily symmetrical as on the figure. In the example, with reference to FIG. 7, a bulkhead 7b comprises nine plates 18a to 18i.

It should be noted that the circumferential distance a between two bulkheads is less than the axial extension b of the herringbones and substantially equal to the circumferential extension of the herringbones. The air flux F1 loaded with oil droplets thus follows a sinuous path in the axial direction.

Radial channels 19 are also formed on both sides of the surfaces of the plates 18a to 18i of the axial bulkheads 7b. As shown in FIGS. 6 and 7, several channels 19 are arranged on the surface of each plate 18a to 18i, between two folds of the longitudinal bulkhead 7b, and these channels extend over the entire radial height of the longitudinal bulkhead 7b.

Several variants are possible for forming the channels 19. The box A in FIG. 6 shows a first variant in which the channels are formed between transverse stator fins on the plates 18a to 18i. The box B in FIG. 6 shows a second variant in which the plates 18a to 18i are thin and have a serrated profile. The channels are then formed by the crenellations. FIG. 7 suggests another variant where the channels are excavated into the thickness of the plates 18a to 18i.

The width c and the depth d of the channels 19 is adjusted to collect the oil deposited on the bulkhead 7b and to protect the oil film 17 formed there from the air flux F1 along the bulkhead.

Given the sinuous nature of the path followed by the flux F1 between the bulkheads 7b, as illustrated in FIG. 6, the oil drops, represented by dots, are projected towards the bulkheads by the corrugations. They are then captured by the radial channels 19 and, as shown in FIG. 7, form oil films 17 which flow along the channels towards the outer peripheral wall 3b under the effect of centrifugal force, while being relatively protected from the flux F1.

Generally speaking, the longitudinal bulkheads 7b start just behind the axial inlet of the centrifugal enclosure 6 and extend to the opposite axial end formed by the transverse wall 3a.

In one embodiment, illustrated in FIG. 6, not all longitudinal bulkheads 7b start from the inlet 5 of the centrifugal enclosure 6. One or more portions of the corrugations may be omitted. In FIG. 6, for example, the first plate 18a' of the second bulkhead 7b from the bottom is removed. This causes the second bulkhead 7b to start at a distance e from the axial inlet 5. This has the advantage that the discharge channels 19 are not saturated with large drops from the inlet.

Furthermore, in variants not shown, the widths and depths of the discharge channels 19 may also vary in the axial direction as the air advances through the degasser. Their depths may also vary depending on their location.

FIG. 8 illustrates this arrangement with a tight annular row of longitudinal bulkheads 7b. The oil outlet orifices 8 are made on the outer wall 3a in each compartment between two bulkheads 7b at locations close to the folding points between two plates 18a, 18b, . . . . Indeed, it is at these folding points that the oil sent towards the peripheral wall 3a will tend to accumulate.

The disclosure is not limited to the examples shown. It also covers numerous forms of corrugations of the longitudinal bulkheads, as well as walls whose shapes change in the axial and radial directions. Moreover, all these solutions can be applied with a rich diversity of materials to form the longitudinal bulkheads 7b: aluminium, steel, plastic, etc. . . . .

Furthermore, the additive manufacturing allows to adapt the bulkheads 7b to complex shapes of the centrifugal enclosure.

Figure 9:
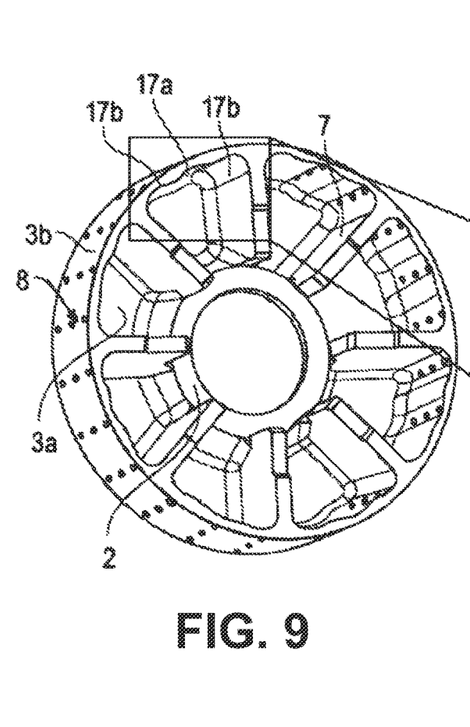
FIG. 9 is a schematic perspective view of the interior of the moving component of FIG. 2, according to a first embodiment of the disclosure, cut by a transverse plane.

In the embodiment shown in FIG. 9 and following, the peripheral wall 3b also collects centrifuged droplets within the mixture passing through each compartment. In fact, all the oil separated from the mixture by the degasser inside the enclosure 6 is collected by the peripheral wall 3b. It is therefore important that this oil is effectively drained towards the orifices 8 provided on the peripheral wall 3b to be ejected towards the outside of the degasser. This prevents an oil pocket from accumulating against the outer wall 3b, and oil from being torn away by the flux of the mixture and then leaving in the hollow shaft 14 through the radial outlet 11, thus impairing the performance of the degasser.

According to the disclosure, the radially inner surface of the peripheral wall 3b comprises recessed patterns connected to the mouth of the discharge orifices 8, so as to drain the oil collected by the peripheral wall 3b to the orifices 8.

In a particular embodiment, with reference to FIGS. 3 and 4, the inner surface of the peripheral wall 3b forms longitudinal grooves or channels, 17a and 17b, inside each compartment, between two longitudinal walls 7. The discharge orifices 8 are distributed in axial rows at the bottom of each channel, 17a or 17b, along the line of greatest radial distance in the channel. In the example shown, each compartment has a central channel 17a and two lateral channels 17b, located near the junction with the longitudinal walls 7. The arrows in FIG. 10 schematically illustrate the path of oil droplets which, once they have arrived on the peripheral wall 3b, are guided by centrifugal effect towards the bottom of the channels 17a or 17b, to be discharged through the orifices 8.

Figures 10, 11:
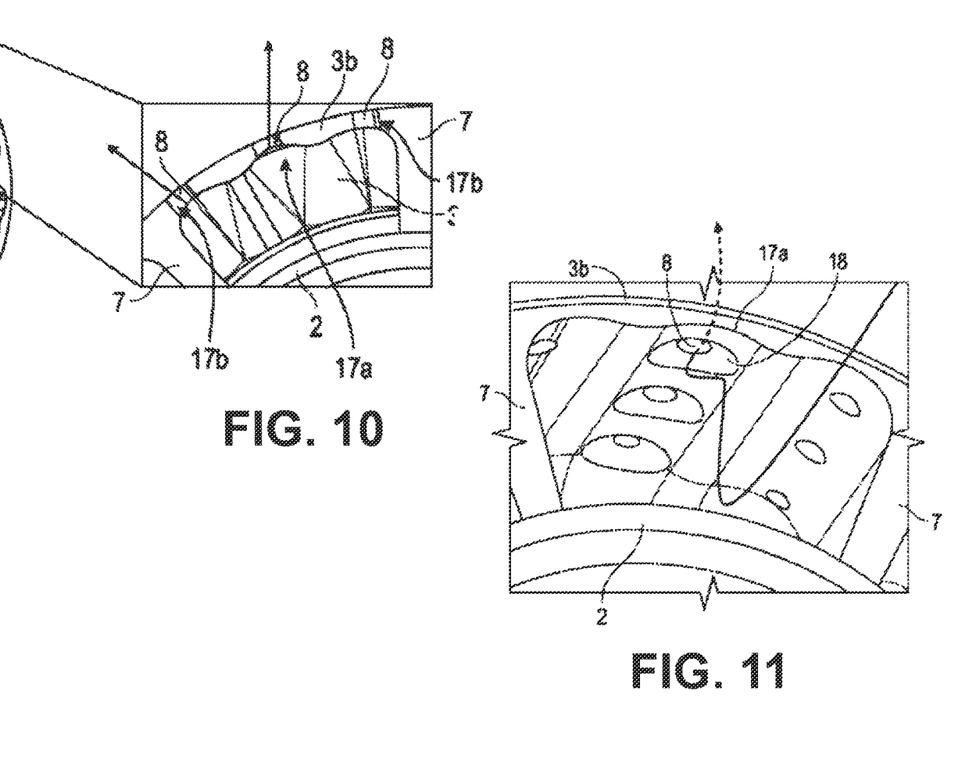
FIG. 10 shows a detail of FIG. 9.
FIG. 11 shows a schematic perspective view of a compartment of the enclosure of the moving component of FIG. 2, according to a second embodiment of the disclosure, cut by a transverse plane.

In another embodiment, with reference to FIG. 11, the discharge orifices 8 are also distributed in axial rows along the peripheral wall 3b in each compartment, between two longitudinal walls 7. Here, a trough 18 surrounds each orifice 8 on the inner surface of the peripheral wall 3b. Each trough is shaped as a portion of a sphere recessed into the inner surface of the wall 3b. FIG. 11 shows an example of an embodiment where the use of troughs 18 around the orifices 8 is combined with the previous embodiment. In fact, the spherical troughs 18 are here dug in the central channel 17a of a peripheral wall 3b previously shaped as in FIGS. 9 and 10. The arrow in FIG. 11 illustrates how an oil droplet can be captured towards an orifice 8 by such a wall 3b.

Figure 12:
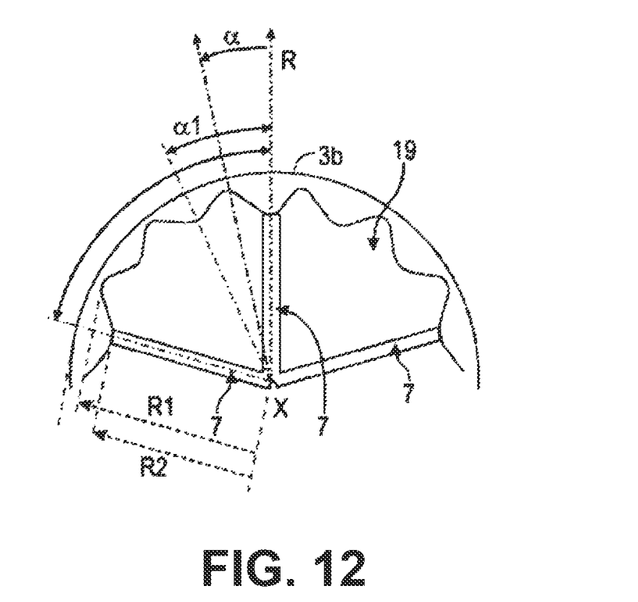
FIG. 12 shows a block diagram of the variation in shape of the interior surface of the peripheral wall of the enclosure of the component of FIG. 2 made in accordance with the disclosure, according to a transverse section.
Figure 13:
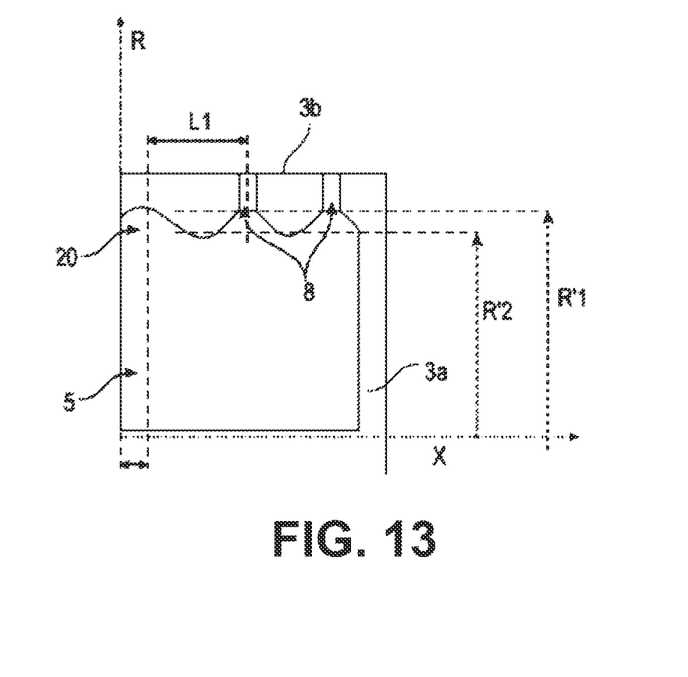
FIG. 13 shows a block diagram of the variation in shape of the interior surface of the peripheral wall of the enclosure of the component of FIG. 2 made according to the disclosure, following an axial section.

More generally, with reference to FIGS. 12 and 13, the inner surface of the peripheral wall 3b may have corrugations of varying shape along the circumferential a and axial R directions.

With reference to FIG. 12, the surface corrugations in the circumferential direction are defined by an angular pitch al and an amplitude between a maximum radius R1 and a minimum radius R2. As illustrated in the figure, the pitch $\alpha 1$ and the amplitudes (R1-R2) may vary from one compartment of the enclosure to another. The pitch and amplitude may also vary circumferentially and/or axially within a compartment, to take into account how the oil arrives on the wall 3b.

With reference to FIG. 13, the surface corrugations in the axial direction are defined by a longitudinal pitch L1 and an amplitude between a maximum radius R'1 and a minimum radius R'2. The pitch and amplitudes of the example in FIG. 13 may vary in the axial direction. The pitch and amplitude may also vary circumferentially and/or axially within a compartment, to take account of the way in which the oil is delivered to the wall 3b.

The orifices 8 are preferably located at areas of maximum radius on the surface. The areas of maximum radius, 19 or 20, shown in FIGS. 12 and 13, may form longitudinal or transverse channels, or troughs by combining the corrugations in the axial and circumferential directions. In addition, the corrugations may have substantially sinusoidal shapes as shown in the figures. For example, if the orifices 8 are periodically distributed along longitudinal lines, as in the case of FIGS. 10 and 11, circumferential corrugations based on the position of the longitudinal lines and longitudinal corrugations based on the longitudinal position of the orifices can be combined to form troughs centred on the orifices. These troughs, the bottom of which has a maximum radius R'1, are surrounded at the four corners by vertices of minimum radius R'2 and separated by necks between two vertices. The longitudinal and circumferential corrugations can also have complex evolving shapes, so as to reproduce the channels and/or spherical troughs shown in FIGS. 10 and 11.

Indeed, the disclosure is not limited to the examples shown in the figures. It covers all possible geometrical variations of the internal surface, such as:
a variation in the depth of the channels or troughs along their circumferential or axial layout,
a variation in the angular pitch of the corrugations between two compartments or within the same compartment
a variation in the axial pitch between two compartments or within the same compartment,
a variation in the shape of troughs (conical, semi-spherical, etc.).

All these solutions can be applied with a wide variety of materials to form the peripheral wall 3b: aluminium, steel, plastic, etc.

Moreover, the additive manufacturing allows to easily obtain complex shapes of the centrifugal enclosure and in particular for the internal surface of the peripheral wall 3b.

The invention claimed is:

1. A component for a centrifugal degasser for an air/oil mixture of a turbomachine, configured to rotate about an axis of symmetry, forming an annular enclosure for centrifugal separation of said mixture, the enclosure forming a fluid passage duct, one inlet of which is oriented axially to supply the enclosure with said mixture, and a first outlet of which is oriented radially inwards to discharge the de-oiled air separated from said mixture, the enclosure further comprising at least one second oil outlet oriented radially outwards and configured to discharge the oil separated from said mixture to the outside of the degasser, wherein said enclosure comprises longitudinal walls passing radially therethrough, at least one surface of said longitudinal walls having surface structures and/or corrugations arranged to form obstacles to a flux of said mixture along the surface of said longitudinal walls.

2. The component according to claim 1, further comprising an annular row of said longitudinal walls forming, between two successive longitudinal walls, passages for the flux through the enclosure in the axial direction, the distance between the longitudinal walls being less than the radial extension of said longitudinal walls.

3. The component according to claim 1, wherein the surface of the longitudinal walls has a rough surface condition that protects an oil film from the flux of said mixture.

4. The component according to claim 1, wherein the longitudinal walls form thin plates having corrugations in the axial direction.

5. The component according to claim 1, wherein channels excavated on at least one face of said longitudinal walls extend radially thereon and drain an oil film towards an outer peripheral wall of the annular enclosure.

6. The component according to claim 4, wherein several channels are arranged between two folds of one of the corrugations.

7. The component according to claim 6, wherein the second oil outlet comprises orifices passing through an outer peripheral wall of the annular enclosure, positioned in each compartment between two longitudinal walls at the level of the folds between two corrugations.

8. The component according to claim 3, wherein some longitudinal walls start after the others in the axial direction, behind the axial inlet.

9. The component according to claim 1, wherein the component is manufactured in one component.

10. A centrifugal degasser for an air/oil mixture of a turbomachine comprising a component according to claim 1, wherein a hollow shaft is secured to said component and configured to collect the air leaving the internal radial outlet, and a pinion for rotating the assembly.

11. The component according to claim 9, wherein the component is manufactured by additive manufacturing.

* * * * *